Feb. 6, 1934.  H. H. FENNER ET AL  1,945,682
AUTOMATIC STOP AND CHANGE OVER FOR MOVING PICTURE PROJECTORS
Filed Feb. 25, 1929  3 Sheets-Sheet 1

Howard H. Fenner
Robert E. Silvis
INVENTOR

BY Thomas Bilyeu
ATTORNEY

Feb. 6, 1934. H. H. FENNER ET AL 1,945,682
AUTOMATIC STOP AND CHANGE OVER FOR MOVING PICTURE PROJECTORS
Filed Feb. 25, 1929   3 Sheets-Sheet 2

Howard H. Fenner
Robert E. Silvis
INVENTOR

BY Thomas Bilyeu
ATTORNEY

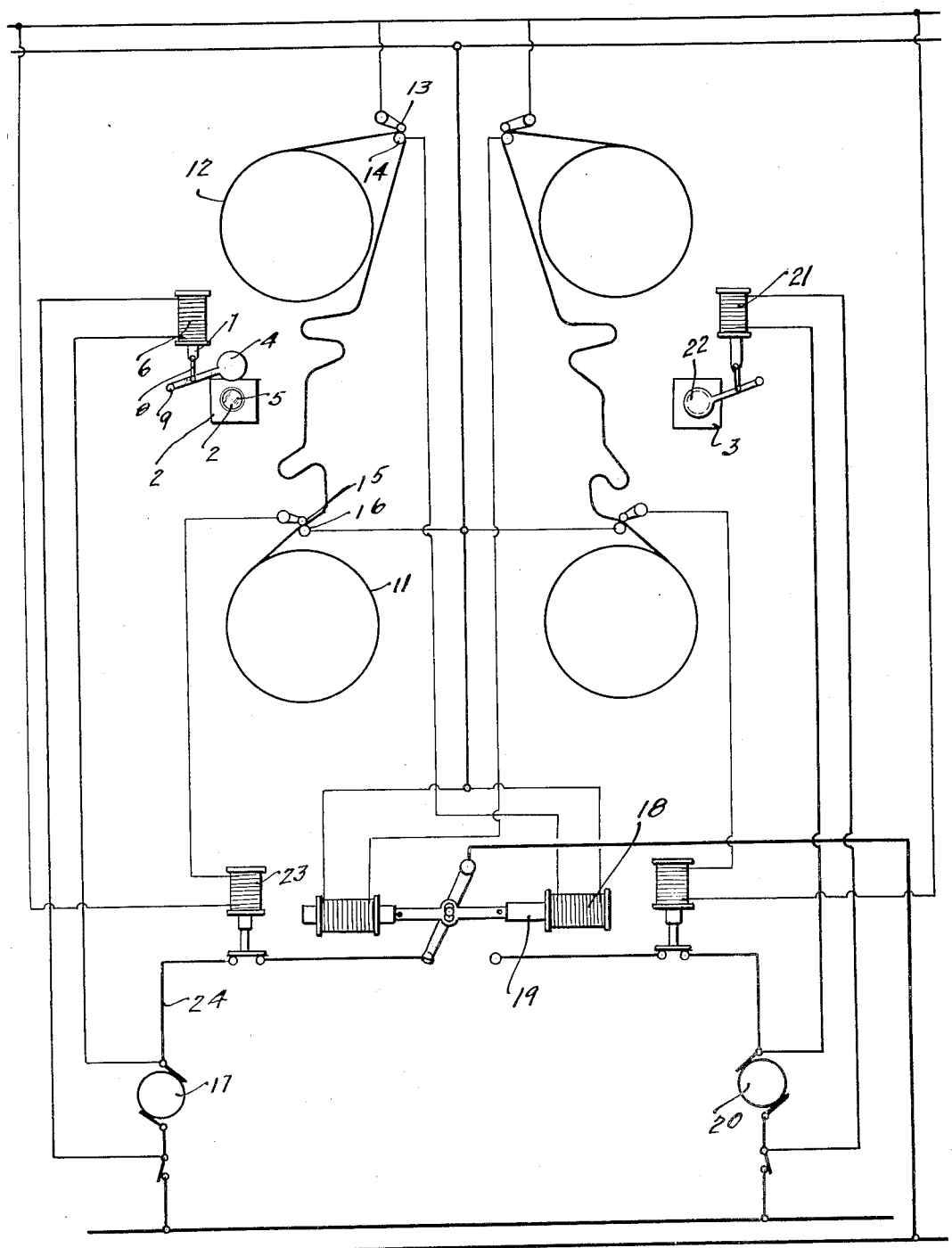

Patented Feb. 6, 1934

1,945,682

UNITED STATES PATENT OFFICE 1,945,682

AUTOMATIC STOP AND CHANGE OVER FOR MOVING PICTURE PROJECTORS

Howard H. Fenner and Robert E. Silvis,
Mill City, Oreg.

Application February 25, 1929. Serial No. 342,352

1 Claim. (Cl. 88—17)

The primary purpose and object of our device is for use in conjunction with moving picture projectors and has for its most important object the stopping of the winding of the reel and the overwinding or unwinding of the film in the event of a breakage within the film being projected and simultaneously therewith the closing of the shutter through which the light rays are being projected to thereby prevent or lessen the fire hazard.

A further object of our invention is to prevent the overrotation of the reel in the event that a break in the film occurs and to stop the winding motor instantaneously thereby lessening the time required for making repairs in the broken film being projected.

A further object of our invention is to automatically stop the winding motor in the dual machine when the end of the film has been reached and to simultaneously and automatically start the other projecting machine to winding, thus lessening the time of break when changing from one film section to the other film section in the projecting operation.

A further object of our invention is to eliminate the tension required upon the operator and the close attention of the same when the end of the film is being reached which he is now required to make the change from one film section to the other as is now required. At present such connection is a manual operation on the part of the operator.

Our invention consists of a plurality of solenoids arranged in independent electric circuits to automatically and simultaneously change from one projecting machine and the winding of one film section to another projecting machine and another film section, simultaneously and to stop the winding motor and close the dowser shutter simultaneously when a break occurs within the film section.

With these and incidental objects in view, the invention consists in certain novel features of construction of parts, the essential elements of which are set forth in the appended claim, and a preferred form of embodiment of which is hereinafter shown with reference to the drawings which accompany and form a part of this specification:

Fig. 7 is a diagrammatical lay-out of the wiring systems necessary to accomplish the results stated.

Like reference characters refer to like parts throughout the several views.

Figure 1:
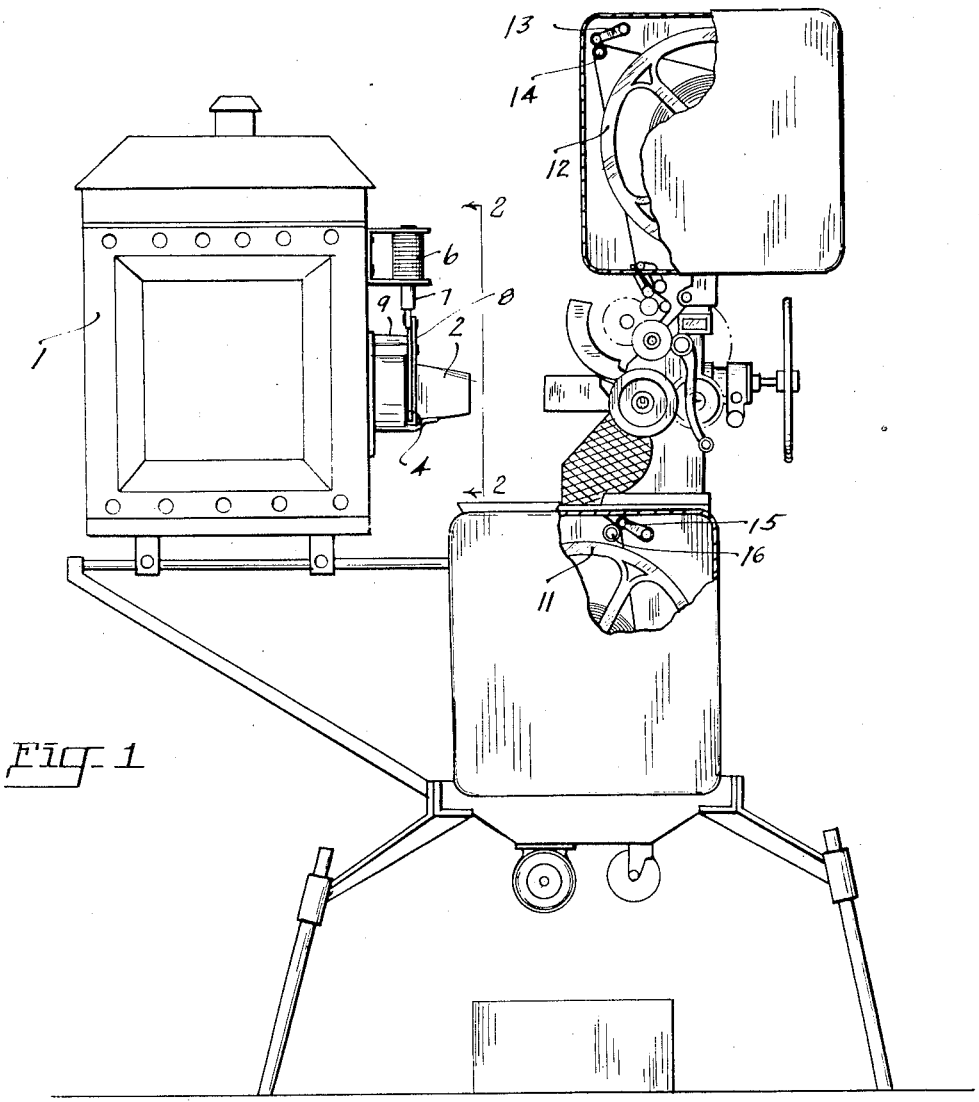
Fig. 1 is a side view, partially in section of a projecting machine of the type now in general use.
Figure 2:
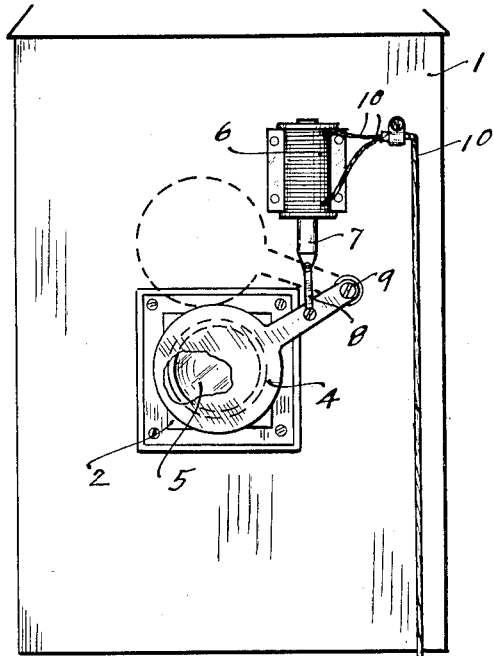
Fig. 2 is a front view, taken on line 2—2 of Fig. 1, looking in the direction indicated.
Figure 3:
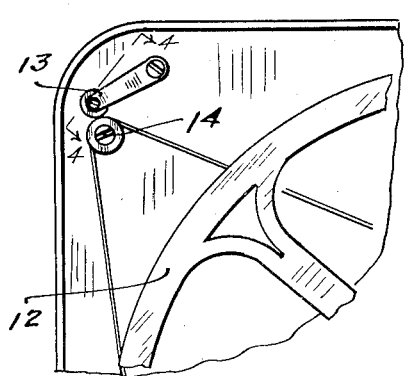
Fig. 3 is an enlarged fragmentary sectional side view of one of the electric connections through which the film to be projected is drawn.
Figure 4:
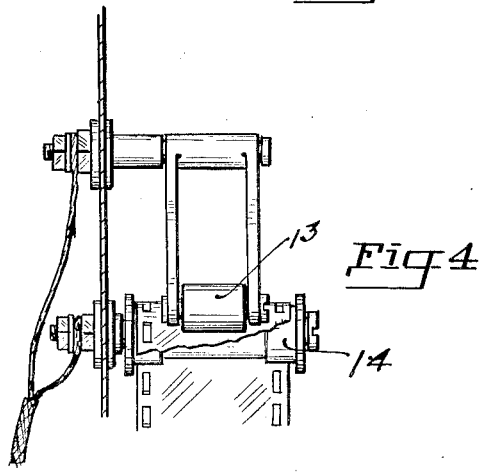
Fig. 4 is a fragmentary, sectional, end view, taken on line 4—4 of Fig. 3, looking in the direction indicated.
Figure 5:
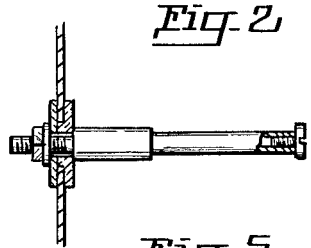
Fig. 5 is a fragmentary, sectional, side view of the spindle illustrated as attached to the supporting side wall of the device and upon which a spool is disposed over which the film is to be drawn.
Figure 6:
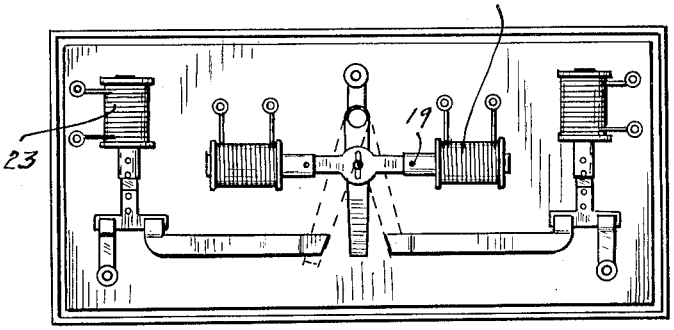
Fig. 6 is a top, plan view, of the solenoid mechanism, illustrating the same in neutral position and associated elements being adaptable to shifting from one machine to the other when it is desired to change from one projecting lens to another and to simultaneously therewith stop one of the winding mechanisms and to start the other of the winding mechanisms.

1 is a lamphouse having an outlet 2 disposed upon one side of the lamphouse 1. The lamphouse outlet has a shutter closure 4, when in normal position being disposed over the lens 5. A solenoid 6 having a stem 7 secured to the shutter 4 by the link 8 is secured upon its one end to the solenoid core 7 and upon its other end to the shutter 4. The shutter 4 is pivotally secured to a supporting pin 9. When the solenoid 6 is not energized by the passing of current therethrough through the electrical conductors 10 the shutter is in the full line position, as illustrated in Fig. 2, but when electric current passes through the solenoid, the shutter 4 is raised into the dotted position, as illustrated in Fig. 2 in which position it remains so long as current is being passed through the solenoid. The film to be projected is wound upon the spool 11 and unwound from the spool 12 and as the winding progresses the same passes between electric terminals 13 and 14, 15 and 16 with the film passing between each of the terminals which acts as an insulating medium to prevent the contacting of the respective electrical terminals, but should a break occur within the film, a short is at once set up between the respective terminals 15 and 16 this short prevents current passing through the solenoid 6 and instantly the shutter 4 closes the projecting lens thus eliminating possibility of fire hazard by the film being burned by the projecting light rays and simultaneously therewith the current is broken passing through the winding motor 17 during the shut off of the projecting light rays and the stopping of the motor and film may be repaired and the projecting be continued through the arrangement heretofore described but when the projecting of the film section disposed upon the spools 11 and 12 has been completed and the circuit has been broken by a short being created between the electric terminals 13 and 14, the solenoid 18 is energized thereby drawing the core of the solenoid in the opposite direction, thus breaking the current in the winding motor 17 and completing the circuit through the winding motor 20, thus simultaneously therewith energizing the solenoid 21 and raising the shutter 22 free of the projecting outlet 3, thus stopping the winding motor upon the one side and simultaneously starting the one upon the oppositely disposed side. When the electric contacts 15 and 16 short the circuit, the solenoid 23 is energized thereby heating the main motor circuit 24 and the motor 17 at the same time demagnetizing the solenoid 6 connected in parallel with the motor which closes the shutter 4.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claim which follows:

What we claim is:

In a device of the class described, the combination of a pair of motion picture film projecting machines, each of said machines being provided with a driving motor, of an electric circuit embracing said motors and a switch adapted to be actuated by a pair of solenoids for alternately directing electrical energy to either of said motors, said solenoids being embraced within an electric circuit held open by the picture films passing between and insulating a pair of rollers disposed within the same circuit so that breakage of the film in one machine will cause a closing of the switch actuating solenoid circuit with a resultant throw of the switch to open the motor circuit in that machine and to close the motor circuit in the other machine, an additional circuit in each machine embracing a solenoid actuator circuit breaker in each motor circuit and also another pair of film insulated rollers adapted to actuate the circuit breaker upon breakage of the film and another circuit forming a part of the motor circuit and controlled by the above-mentioned circuit breaker embracing a solenoid and a dowser actuated thereby, said solenoid adapted to hold the dowser away from the lens when the motor circuit is closed and to drop the dowser in front of the lens upon opening of that motor circuit.

HOWARD H. FENNER.
ROBERT E. SILVIS.